United States Patent
Choi et al.

(10) Patent No.: US 10,103,904 B2
(45) Date of Patent: Oct. 16, 2018

(54) METHOD AND DEVICE FOR ESTIMATING CHANNEL IN WIRELESS COMMUNICATION SYSTEM

(71) Applicants: Samsung Electronics Co., Ltd., Gyeonggi-do (KR); IMPERIAL INNOVATIONS LIMITED, London (GB)

(72) Inventors: Seung-Hoon Choi, Gyeonggi-do (KR); Bruno Clerckx, London (GB); Chenxi Hao, London (GB)

(73) Assignees: Samsung Electronics Co., Ltd (KR); Imperial Innovations Limited, London (GB)

( * ) Notice: Subject to any disclaimer, the term of this patent is extended or adjusted under 35 U.S.C. 154(b) by 30 days.

(21) Appl. No.: 15/027,143

(22) PCT Filed: Oct. 6, 2014

(86) PCT No.: PCT/KR2014/009395
§ 371 (c)(1),
(2) Date: Apr. 4, 2016

(87) PCT Pub. No.: WO2015/050421
PCT Pub. Date: Apr. 9, 2015

(65) Prior Publication Data
US 2016/0248607 A1     Aug. 25, 2016

Related U.S. Application Data

(60) Provisional application No. 61/886,937, filed on Oct. 4, 2013, provisional application No. 62/020,108, filed on Jul. 2, 2014.

(51) Int. Cl.
H04W 72/04     (2009.01)
H04L 25/02     (2006.01)
(Continued)

(52) U.S. Cl.
CPC ........ *H04L 25/0224* (2013.01); *H04L 5/0048* (2013.01); *H04L 25/022* (2013.01);
(Continued)

(58) Field of Classification Search
CPC .......... H04L 25/02; H04L 5/00; H04W 72/08; H04W 72/04
See application file for complete search history.

(56) References Cited

U.S. PATENT DOCUMENTS

2007/0104253 A1     5/2007 Luo et al.
2008/0070564 A1     3/2008 Li et al.
(Continued)

FOREIGN PATENT DOCUMENTS

| CN | 102100015 | 6/2011 |
| CN | 102638424 | 8/2012 |

(Continued)

OTHER PUBLICATIONS

Ali et al., Jul. 7, 2012, IEEEvol. 58, Completely Stale Transmitter Channel State Information is Still Very Useful p. 4418-4431.*

(Continued)

*Primary Examiner* — Lakeram Jangbahadur
(74) *Attorney, Agent, or Firm* — The Farrell Law Firm, P.C.

(57) ABSTRACT

A method for estimating a channel in a wireless communication system in which a plurality of terminals and a base station communicate with each other, according to one embodiment of the present invention, comprises the steps of: receiving reference signals transmitted through a plurality of slots; and estimating a channel by using the reference signals. Here, for the channel estimation, the number of reference signals received through at least one slot among the plurality of slots is different from the number of reference signals received through the other slots.

8 Claims, 3 Drawing Sheets

(51) Int. Cl.
H04L 5/00 (2006.01)
H04W 72/08 (2009.01)

(52) U.S. Cl.
CPC ..... *H04L 25/0242* (2013.01); *H04W 72/0446* (2013.01); *H04W 72/082* (2013.01)

(56) References Cited

U.S. PATENT DOCUMENTS

| | | | |
|---|---|---|---|
| 2011/0194551 A1* | 8/2011 | Lee | H04B 7/0626 370/342 |
| 2011/0212730 A1 | 9/2011 | Wennstrom et al. | |
| 2011/0228722 A1* | 9/2011 | Noh | H04L 27/2605 370/315 |
| 2012/0170635 A1 | 7/2012 | Peroulas | |
| 2013/0034070 A1* | 2/2013 | Seo | H04B 7/155 370/329 |
| 2013/0064169 A1 | 3/2013 | Song et al. | |
| 2013/0128761 A1* | 5/2013 | Kang | H04W 72/046 370/252 |
| 2013/0163569 A1* | 6/2013 | Lee | H04L 1/0045 370/336 |
| 2013/0194931 A1* | 8/2013 | Lee | H04L 5/0053 370/241 |
| 2016/0112994 A1* | 4/2016 | Wang | H04L 5/0048 370/329 |

FOREIGN PATENT DOCUMENTS

| | | |
|---|---|---|
| CN | 102752034 | 10/2012 |
| CN | 102859900 | 1/2013 |
| KR | 1020100110398 | 10/2010 |
| KR | 1020120070055 | 6/2012 |
| KR | 1020130074731 | 7/2013 |

OTHER PUBLICATIONS

PCT/ISA/210 Search Report issued on PCT/KR2014/009395 (pp. 3).
Mohammad Ali Maddah-Ali et al., "Completely Stale Transmitter Channel State Information is Still Very Useful", IEEE Transactions on Information Theory, Jul. 1, 2012, 14 pages.
European Search Report dated Jun. 9, 2017 issued in counterpart application No. 14851117.3-1874, 8 pages.
Chinese Office Action dated Jul. 4, 2018 issued in counterpart application No. 201480066747.5, 18 pages.

* cited by examiner

METHOD AND DEVICE FOR ESTIMATING CHANNEL IN WIRELESS COMMUNICATION SYSTEM

PRIORITY

This application is a National Phase Entry of PCT International Application No. PCT/KR2014/009395, which was filed on Oct. 6, 2014, and claims priority to U.S. Provisional Patent Application No. 61/886,937, which was filed on Oct. 4, 2013, and U.S. Provisional Patent Application No. 62/020,108, which was filed on Jul. 2, 2014, the contents of each of which are incorporated herein by reference.

TECHNICAL FIELD

The present invention relates to a method and apparatus for estimating a channel in a wireless communication system.

BACKGROUND ART

With technology breakthroughs, mobile communication systems have evolved to provide high-speed data communication services as well as voice communication services. Recently, Long Term Evolution (LTE) systems as one of next-generation mobile communication systems in the $3^{rd}$ Generation Partnership Project (3GPP) have provided services in various countries. The LTE system is a technology capable of implementing high-speed packet-based communication having a data rate of 100 Mbps or higher. Also, LTE-Advanced (LTE-A) systems are under commercialization to further improve the data rate of the LTE systems.

Multi user-multiple input multiple output (MU-MIMO) and coordinated multipoint (CoMP) in LTE systems are known to rely heavily on accurate channel state information (CSI) knowledge at a transmitter. MIMO is a technology for increasing capacity in proportional to the number of antennas being used, by using multiple antennas at a base station (BS) and a terminal. The MU-MIMO is one of MIMO schemes that distribute antenna resources or radio spatial resources to multiple users. The CoMP is a technology capable of reducing interference and improving a data rate based on cooperation among multiple BSs.

Unfortunately, in several applications, CSI feedback is subject to delay due to CSI measurement and feedback mechanism, base station implementation and/or backhaul (as in CoMP). A classical approach is to use predictive methods to estimate the current CSI based on past and outdated estimates. When the delay is severe and channel state information at a receiver (CSIR) is completely outdated, such an approach does not provide satisfactory results. Recently, another approach has been suggested to cope with delay and exploit delayed channel state information at a transmitter (CSIT). In LTE systems, CSI at a transmitter is referred to as CSIT and CSI at a receiver is referred to as CSIR.

Recent study such as MAT, Alt MAT, and GMAT as generalized MAT have drawn considerable interests in the academic literature as they have shown to be able to benefit in a two-user scenario from a 33% sum-rate increase compared to TDMA (also known as SU-MIMO in LTE-A) despite the fact that the CSI feedback is completely outdated. MAT, Alt MAT, and GMAT may refer to the following documents [1], [2], and [3]:

[1] M. Maddah-Ali and D. Tse, "Completely stale transmitter channel state information is still very useful," IEEE Trans. Inf. Theory, vol. 58, no. 7, pp. 4418~431, 2012;

[2] S. Yang, M. Kobayashi, D. Gesbert, and X. Yi, "Degrees of freedom of time correlated miso broadcast channel with delayed csit," IEEE Trans. Inf. Theory, vol. 59, no. 1, pp. 315~328, 2013; and

[3] X. Yi and D. Gesbert, "Precoding methods for the MISO broadcast channel with delayed CSIT," IEEE Trans. Wireless Commun., vol. 12, no. 5, pp. 1~11, May 2013.

The major drawback of those schemes is that global CSI is to be known at all terminals. For example, assuming a communication environment including one BS and two users, user 1 has to know a channel between the BS and user 2. This constraint departs significantly from classical communication systems where a user is only aware of its own channel (between the BS and itself). One way to cope with the problem would be to enable CSI sharing among users through device to device (D2D) communications for instance. However it would severely increase the operation complexity and limit the benefits and applicability of the schemes.

DETAILED DESCRIPTION OF THE INVENTION

Technical Problem

The present invention provides a method and apparatus for estimating a channel in a wireless communication system, by which a CSI sharing constraint may be eliminated.

The present invention provides a method and apparatus in a wireless communication system, by which MAT, Alt MAT, and GMAT may be operated using reference signals without CSI sharing.

Technical Solution

In accordance with an aspect of the present invention, there is provided a method for performing channel estimation in a wireless communication system in which a plurality of terminals and a base station communicate with each other, the method including receiving reference signals transmitted through a plurality of slots and performing channel estimation by using the reference signals, in which for the channel estimation, a number of reference signals received through at least one of the plurality of slots is different from a number of reference signals received through the other slots.

In accordance with an aspect of the present invention, there is provided a terminal for performing channel estimation in a wireless communication system in which a plurality of terminals and a base station communicate with each other, the terminal including a receiver configured to receive signals transmitted from the base station and a controller configured to control reception of reference signals transmitted through a plurality of slots and to control performing of the channel estimation by using the reference signals, in which for the channel estimation, a number of reference signals received through at least one of the plurality of slots is different from a number of reference signals received through the other slots.

MODE FOR CARRYING OUT THE INVENTION

In the following description of the present invention, well-known functions or structures will not be described in detail if they are determined to unnecessarily obscure the subject matter of the present invention. Hereinafter, embodiments of the present invention will be described in detail with reference to the accompanying drawings.

A description will now be made of a MAT scheme, an Alt MAT scheme, and a GMAT scheme proposed in an embodiment of the present invention. General definitions of equations used as examples in a description of each scheme may refer to the documents [1], [2], and [3] described in the background part of the specification, and thus will not be provided in this part.

Figure 1:
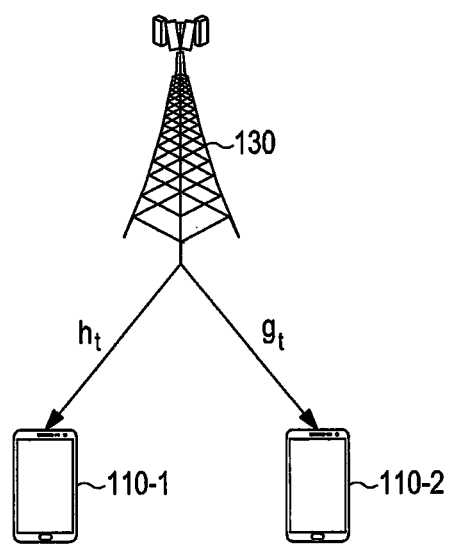
FIG. 1 is a diagram for describing MAT, Alt MAT, and GMAT proposed in an embodiment of the present invention.

1. MAT Scheme 1-1. Review of 2-User MAT Scheme:

FIG. 1 is a diagram for describing an MAT scheme in a wireless communication system according to an embodiment of the present invention. In FIG. 1, a wireless environment is assumed where there are two users (that is, two terminals) for each of which two transmission antennas and one reception antenna are provided. An example shown in FIG. 1 is intended for convenience and there may be two or more users.

Referring to FIG. 1, $h_t$ and $g_t$ represent channels between users (receivers) and a base station (BS, a transmitter), respectively. It is assumed that CSI $g_{t-1}$ and $h_{t-1}$ (size [1×2]) are available to a transmitter 130 at time t (that is, CSI feedback is delayed). A channel between t-1 and t is completely uncorrelated (that is, the channel is very fast fading). The BS (transmitter) 130 and each of users (receivers) 110-1 and 110-2 at time t have knowledge of other users' channel till time t-1 (global CSI knowledge). Transmission is operated in three time slots described as follows:

Slot 1: Broadcast 2×1 symbol vector $x_1$ to user 1 110-1: $x_1=[u_{11}\ u_{12}]^T$: in this case, a signal $y_1$ (noise will be ignored for simplicity) observed (received) in user 1 110-1 is $y_1=h_1x_1$, and a signal $z_1$ observed in user 2 110-2 is $z_1=g_1x_1$;

Slot 2: Broadcast 2×1 symbol vector $x_2$ to user 2 110-2: $x_2=[v_{21}\ v_{22}]^T$ ($[\ ]^T$ represents a transpose): in this case, a signal $y_2$ observed in user 1 is $y_2=h_2x_2$, and a signal $z_2$ observed in user 2 110-2 is $z_2=g_2x_2$; and Slot 3: Forward a mixture of overheard interference $x_3=[g_1x_1+h_2x_2\ 0]^T$: in this case, a signal $y_3$ observed in user 1 is $y_3=h_3x_3$, and a signal $z_3$ observed in user 2 110-2 is $z_3=g_3x_3$.

After three user slots, each user combines all observations as follows:

a) For user 1,
$y_1=h_1x_1$
$y_2=h_2x_2$ $$y_3=h_3x_3=h_{3,1}(g_1x_1+h_2x_2)=y_3'+h_{3,1}y_2$$

(where $y_3'=h_{3,1}g_1x_1$ and $h_{3,1}$ is the first entry of $h_3$)

or equivalently $$Y=H_1x_1+H_2x_2$$

(where $Y=[y_1\ y_2\ y_3]^T$, $H_1=[h_1;\ 0;\ h_{3,1}\ g_1]$, $H_2=[0;\ h_2;\ h_{3,1}\ h_2]$); and b) for user 2,
$z_1=g_1x_1$
$z_2=g_2x_2$
$z_3=g_3x_3=g_{3,1}(g_1x_1+h_2x_2)=z_3'+g_{3,1}z_1$ (where $z_3'=g_{3,1}h_2x_2$ and $g_{3,1}$ is the first entry of $g_3$)

or equivalently $$Z=G_1x_1+G_2x_2$$

(where $Z=[z_1\ z_2\ z_3]^T$, $G_1=[g_1;\ 0;\ g_{3,1}\ g_1]$, $G_2=[0;\ g_2;\ g_{3,1}\ h_2]$).

User 1 110-1 and user 2 110-2 each may decode two symbols as follows:

1) With an MMSE Receiver

For user 1 110-1, an MMSE receiver F1 is computed based on $H_1$ and $H_2$ as follows:

$$F_1=H_1^H(H_1H_1^H+H_2H_2^H+\beta I_3);\text{ and}$$

For user 2 110-2, an MMSE receiver F2 is computed based on $G_1$ and $G_2$ as follows:

$$F_2=G_2^H(G_2G_2^H+G_1G_1^H+\beta I_3).$$

2) With Interference Elimination and then MIMO Detection

For user 1 110-1, the effect of $y_2$ in $y_3$ is removed to obtain $y_3'$, and a 2×2 MIMO channel $[y_1y_3']^T=[h_1;\ h_{3,1}\ g_1]\ x_1$ is solved to get $x_1=[u_{11}\ u_{12}]^T$; and For user 2 110-2, the effect of $z_1$ in $z_3$ is removed to obtain $z_3'$, and a 2×2 MIMO channel $[z_2\ z_3']^T=[g_2;\ g_{3,1}\ h_2]\ x_2$ is solved to get $x_2=[v_{21}\ V_{22}]^T$.

Hence, with the interference elimination and then MIMO detection according to an embodiment of the present invention, each user is able to decode 2 interference-free symbols in 3 time slots, leading to a total sum-rate at high SNR or roughly 4/3 log(SNR), i.e. 33% throughput gain over a classical TDMA (SU-MIMO) approach which would transmit one symbol at a time.

1-2. Problem with MAT Scheme:

For the MMSE receiver, $F_1$ and $F_2$ are functions of $H_1$ and $H_2$ and $G_1$ and $G_2$, respectively. $H_1$ and $G_1$ are functions of CSI of the two users 110-1 and 110-2. Similarly, with the interference elimination and MIMO detection, the effective 2×2 MIMO channel of e.g., user 1, i.e., $[h_1;\ h_{3,1}\ g_1]$, is a function of the CSI of user 2 110-2. Thus, for each user, in order to decode their intended signals, the users have to be aware of the global CSI, and it is commonly assumed that CSI sharing is needed among users.

1-3. RS Strategies with MAT Scheme:

In an embodiment of the present invention, taking the foregoing problems into account, a scheme for estimating user CSI using reference signals (RSs) without CSI sharing will be proposed as below.

1) MMSE Receiver

All entries of $H_1$, $H_2$, $G_1$ and $G_2$ have to be estimated.

Assuming the use of only demodulation-reference signal (DM-RS) at the time of transmission, the system would operate in each of slots 1 through slot 3 as in Slot 1 through Slot 3:

Slot 1: transmit 2 DM-RS in order for user 1 110-1 to measure $h_1$ and user 2 110-2 to measure $g_1$;

Slot 2: transmit 2 DM-RS in order for user 1 to measure $h_2$ and user 2 to measure $g_2$; and Slot 3: transmit 4 DM-RS where two DM-RS for user 1 110-1 to measure $h_{3,1}\ g_1$ and for user 2 110-2 to measure $g_{3,1}$ $g_1$ and the other two DM-RS for user 1 110-1 to measure $h_{3,1}$ $h_2$ and user 2 110-2 to measure $g_{3,1}$ $h_2$.

This makes a total of 8 DM-RS in 3 time slots.

2) Interference Elimination and Then MIMO Detection

Channel gains $h_{3,1}$ and $g_{3,1}$ have to be measured in order to remove $y_2$ in $y_3$ and $z_1$ in $z_3$, respectively, and to this end, options 1 and 2 will be considered.

Option 1: One non-precoded RS (CRS/CSI-RS) every three time slots may be used to measure $h_{3,1}$ and $g_{3,1}$; and Option 2: One DM-RS with appropriate precoding (i.e. $[1\ 0]^T$) may be used so as to measure the non-precoded channel.

Assuming the use of only DM-RS at the time of transmission, the system would therefore operate as in Slot 1 through Slot 3:

Slot 1: transmit 2 DM-RS in order for user 1 110-1 to measure $h_1$ and user 2 to measure $g_1$;

Slot 2: transmit 2 DM-RS in order for user 1 110-1 to measure $h_2$ and user 2 110-2 to measure $g_2$; and Slot 3: transmit 5 DM-RS where two DM-RS for user 1 110-1 to measure $h_{3,1}$ $g_1$, two DM-RS for user 2 110-2 to measure $g_{3,1}$ $h_2$ and one DM-RS for user 1 110-1 and user 2 110-2 to measure $h_{3,1}$ and $g_{3,1}$, respectively.

Thus, this makes a total of 9 DM-RS in 3 time slots.

It should be noted that in the current embodiment, the number of DM-RS needed varies depending on the receiver architecture. Moreover, the number of DM-RS is not necessarily equal to the number of transmitted symbols (or layers in LTE-A systems), contrary to classical SU-MIMO and MU-MIMO transmissions in current systems (e.g. LTE-A systems).

2. GMAT Scheme 2-1. Review of 2-User GMAT Scheme:

The GMAT scheme may also assume the communication environment illustrated in FIG. 1. In the GMAT scheme, a generally precoded MAT scheme is considered such that the general transmission looks like the following. The configuration is applicable to any number of transmit antennas $n_t$ given the virtualization by the precoder. Hence, channel CSI is viewed as $[1 \times n_t]$ vectors.

Slot 1: Broadcast 2×1 symbol vector to user 1: $x_1=[u_{11}\ u_{12}]^T$ and precode by a weight $W_1$ (of size $n_t \times 2$): in this case, a signal $y_1$ observed (noise will be ignored for simplicity) in user 1 is $y_1=h_1 W_1 x_1$ and a signal $z_1$ observed in user 2 is $z_1=g_1 W_1 x_1$;

Slot 2: Broadcast 2×1 symbol vector to user 2: $x_2=[v_{21}\ v_{22}]^T$ and precode by $W_2$ (of size $n_t \times 2$): in this case, a signal $y_1$ observed in user 1 is $y_2=h_2 W_2 x_2$, and a signal $z_2$ observed in user 2 is $z_2=g_2 W_2 x_2$; and Slot 3: Forward a mixture of $x_1$ and $x_2$ precoded by $W_3$ and $W_4$ (each of size nt×2): in this case, a signal $y_3$ observed in user 1 is $y_3=h_3 [W_3 x_1 + W_4 x_2]$, and a signal $z_3$ observed in user 2 is $z_3=g_3 [W_3 x_1 + W_4 x_2]$.

If $W_3 = [g_1 W_1; 0; \ldots; 0]$ and $W_4 = [h_2 W_2; 0; \ldots; 0]$, the strategy boils down to the classical (precoded) MAT scheme.

After 3 time slots, each user combines all observations.

a) For user 1, $$Y = H_1 x_1 + H_2 x_2$$

($Y = [y_1\ y_2\ y_3]^T$, $H_1 = [h_1 W_1; 0; h_3 W_3]$, $H_2 [0; h_2 W; h_3 W_4]$.

b) For user 2, $$Z = G_1 x_1 + G_2 x_2$$

($Z = [z_1\ z_2\ z_3]^T$, $G_1 = [g_1 W_1; 0; g_3 W_3]$, $G_2 = [0; g_2 W_2; g_3 W_4]$.

User 1 and user 2 each may decode 2 symbols as follows:

1) With an MMSE Receiver

For user 1, an MMSE Receiver is computed based on $H_1$ and $H_2$ by:

$$F_1 = H_1^H (H_1 H_1^H + H_2 H_2^H + \beta I_3);\text{ and}$$

For user 2, an MMSE receiver is computed based on $G_1$ and $G_2$ by:

$$F_2 = G_2^H (G_2 G_2^H + G_1 G_1^H + \beta I_3).$$

2) With Interference Elimination and then MIMO Detection for the Particular Case of:

$W_3 = [g_1 W_1; 0; \ldots; 0]$ and $W_4 = [h_2 W_2; 0; \ldots; 0]$

For user 1, the effect of $y_2$ in $y_3$ is removed to obtain $y_3'$, and the 2×2 MIMO channel $[y_1\ y_3']^T = [h_1 W_1; h_{3,1} g_1 W_1]$ $x_1$ is solved to get $x_1 = [u_{11}\ u_{12}]^T$; and For user 2, the effect of $z_1$ in $z_3$ is removed to obtain $z_3'$, and the 2×2 MIMO channel $[z_2\ z_3']^T = [g_2 W_2; g_{3,1} h_2 W_2]$ $x_2$ is solved to get $x_2 = [v_{21}\ v_{22}]^T$.

2-2. RS Strategies With GMAT Scheme:

1) MMSE Receiver

All entries of $H_1$, $H_2$, $G_1$ and $G_2$ have to be estimated.

Assuming the use of only DM-RS at the time of transmission, the system would operate as follows:

Slot 1: transmit 2 DM-RS in order for user 1 to measure $h_1 W_1$ and user 2 to measure $g_1 W_1$;

Slot 2: transmit 2 DM-RS in order for user 1 to measure $h_2 W_2$ and user 2 to measure $g_2 W_2$; and Slot 3: transmit 4 DM-RS where two DM-RS for user 1 to measure $h_3 W_3$ and for user 2 to measure $g_3 W_3$ and two DM-RS for user 1 to measure $h_3 W_4$ and user 2 to measure $g_3 W_4$.

This makes a total of 8 DM-RS in 3 time slots.

2) Interference Elimination and Then MIMO Detection

It is not possible to perform such a receiver in the general case of $W_3$ and $W4$. In the particular case of $W_3 = [g_1 W_1; 0; \ldots; 0]$ and $W_4 = [h_2 W_2; 0; \ldots; 0]$, the receiver may be used and 9 DM-RS in 3 time slots would have to be used (2 on this first slot, 2 on the second slot and 5 in the last slot), similarly to the classical MAT.

3. Alternative MAT Scheme 3-1. Review of 2-User Alt MAT Scheme:

The Alt MAT scheme may also assume the communication environment illustrated in FIG. 1. Let us assume again 2 transmission antennas as in the classical MAT. Extension to a larger number of antennas through virtualization is also possible, but does not affect the observations.

The transmission is operated in three times slots described as follows:

Slot 1: Broadcast 2 2×1 symbol vectors: $x_1 = [u_{11}\ u_{12}]^T$ and $x_2 = [v_{21}\ v_{22}]^T$ respectively intended to user 1 and user 2: in this case, a signal $y_1$ (noise will be ignored for simplicity) observed in user 1 is $y_1 = h_1 [x_1 + x_2]$, and a signal $z_1$ observed in user 2 is $z_1 = g_1 [x_1 + x_2]$;

Slot 2: Broadcast the interference overheard by user 1 as the following vector $[h_1\ x_2\ 0]^T$: in this case, a signal $y_2$ observed in user 1 is $y_2 = h_{2,1} h_1 x_2$, and a signal $z_2$ observed in user 2 is $z_2 = g_{2,1} h_1 x_2$; and Slot 3: Broadcast the interference overheard by user 2 as the following vector $[g_1\ x_1\ 0]^T$: in this case, a signal $y_3$ observed in user 1 is $y_3 = h_{3,1} g_1 x_1$, and a signal $z_3$ observed in user 2 is $z_3 = g_{3,1} g_1 x_1$.

After 3 time slots, each user combines all observations.

a) For user 1, $$Y = H_1 x_1 + H_2 x_2$$

($Y = [y_1\ y_2\ y_3]^T$, $H_1 = [h_1; 0; h_{3,1} g_1]$, $H_2 = [h_1; h_{2,1} h_1; 0]$), and b) For user 2, $$Z = G_1 x_1 + G_2 x_2$$

($Z = [z_1 \ z_2 \ z_3]^T$, $G_1 = [g_1; \ 0; \ g_{3,1}g_1]$, $G_2 = [g_1; \ g_{2,1}h_1; \ 0]$).

User 1 and 2 each may decode 2 symbols as follows:

1) With an MMSE Receiver

For user 1, an MMSE receiver is computed based on $H_1$ and $H_2$ by:

$$F_1 = H_1^H (H_1 H_1^H + H_2 H_2^H + \beta I_3); \text{ and}$$

For user 2, an MMSE receiver is computed based on $G_1$ and $G_2$ by:

$$F_2 = G_2^H (G_2 G_2^H + G_1 G_1^H + \beta I_3).$$

2) With Interference Elimination and then MIMO Detection

For user 1, the effect of $y_2$ in $y_1$ is removed to obtain $y_1'$, and a 2×2 MIMO channel $[y_1 \ y_3]^T = [h2,1 \ h_1; h3,1 \ g_1] \ x_1$ is solved to get $x_1 = [u_{11} \ u_{12}]$; and For user 2, the effect of $z_3$ in $z_1$ is removed to obtain $z_1'$, and a 2×2 MIMO channel $[z_1' \ z_2]^T = [g_{3,1} \ g_1; g_{2,1} \ h_1] \ x_2$ is solved to get $x_2 = [v_{21} \ v_{22}]^T$.

3-2. RS Strategies with Alt-MAT Scheme:

1) MMSE Receiver

All entries of $H_1$, $H_2$, $G_1$ and $G_2$ have to be estimated.

Assuming the use of only DM-RS at the time of transmission, the system would operate as follows:

Slot 1: transmit 2 DM-RS in order for user 1 to measure $h_1$ and user 2 to measure $g_1$;

Slot 2: transmit 2 DM-RS in order for user 1 to measure $h_{2,1}h_1$ and user 2 to measure $g_{2,1}h_1$; and Slot 3: transmit 2 DM-RS in order for user 1 to measure $h_{3,1}g_1$ and user 2 to measure $g_{3,1}g_1$.

This makes a total of 6 DM-RS in 3 time slots.

2) Interference Elimination and then MIMO Detection

Channel gains $h_{2,1}$ and $g_{3,1}$ have to be measured in order to remove $y_2$ in $y_1$ and $z_3$ in $z_1$, respectively. For this end, options 1 and 2 are to be considered as below.

Option 1: one non-precoded RS (CRS/CSI-RS) in slot 2 and slot 3 may be used to measure $h_{2,1}$ and $g_{3,1}$; and Option 2: use one DM-RS with appropriate precoding (i.e. $[1 \ 0]^T$) so as to measure the non-precoded channel.

Assuming the use of only DM-RS at the time of transmission, the system would operate as in Slot 1 through Slot 3:

Slot 1: transmit 2 DM-RS in order for user 1 to measure $h_1$ and user 2 to measure $g_1$;

Slot 2: transmit 3 DM-RS: two DM-RS in order for user 1 to measure $h_{2,1}h_1$ and user 2 to measure $g_{2,1}h_1$ and one DM-RS for user 1 to measure $h_{2,1}$: and Slot 3: transmit 3 DM-RS: two DM-RS in order for user 1 to measure $h_{3,1}g_1$ and user 2 to measure $g_{3,1}g_1$ and one DM-RS for user 2 to measure $g_{3,1}$.

Thus, this makes a total of 8 DM-RS in 3 time slots.

It should be noted again that in the current embodiment, the number of DM-RS needed varies with the receiver architecture. In addition, the number of DM-RS is not necessarily equal to the number of transmitted symbols (or layers in LTE-A), contrary to classical SU-MIMO and MU-MIMO transmissions in current systems (e.g. LTE-A systems).

The MAT, Alt MAT, and GMAT schemes proposed in the embodiment of the present invention are also applicable to a broadcast channel. Thus, the embodiment of the present invention may be applied to MU-MIMO operating at a single BS or in scenarios where multiple BSs cooperate with each other (as in 3GPP Rel.11 CoMP). In this case, the central controller in charge of controlling the cooperating BS acts as a giant BS (or a master BS).

4. Transmission Strategy for CoMP With Backhaul Delay

In the current embodiment, an interference channel for K Tx-Rx pairs will be focused where each Tx node is equipped with K transmission antennas while each Rx node has a single antenna. For brevity, this system model is denoted by (K,1,K)-IC, where the first parameter K represents the number of transmission antennas while the last parameter K refers to the number of Tx-Rx pairs.

Each Rx perfectly estimates all its related channels (Perfect CSIR) and quantizes them to report them to the related Tx. This feedback procedure is assumed to be nearly perfect and the delay is not severe compared to the time-varying nature of the channel. Afterwards, each Tx shares CSI with others via a backhaul link. This backhaul link is assumed to be nearly perfect but not subject to severe latency. Hence, when the CSI arrives at a certain Tx, it will be completely outdated (delayed by one transmission slot and the channel is time-selective). Besides, the data is not shared among the transmitters. Consequently, the transmitters cannot perform Joint Processing, only Coordinated Beamforming/Scheduling may be carried with the presence of the perfect delayed CSIT. The current embodiment proposes a new transmission strategy to cope with the backhaul delay.

4-1. Overall Description

In the current embodiment, in each channel use, each receiver not only receives their intended symbols, but also overhears the interferences caused by the unintended symbols.

A certain overheard interference (OI) is desired by two receivers: the Rx that wishes to eliminate them; and the Rx for whom the symbols (contained in OD are intended. Then, the transmitter reconstructs those OIs using the perfect past CSI and transmit them in the following channel uses. As a consequence, all the receivers may decode their desired symbols by canceling the interference and 20 having additional linear independent observation of the desired symbols.

When there are multiple Tx-Rx pairs (for example, K≥3K≥3), there will be $(_2^K)$ pairs of receivers and each pair has two related OIs. To further boost the DoF, the transmitter wishes to send those OIs using channel uses as less as possible. To this end, in the technical document "M. Maddah-Ali and D. Tse, "Completely stale transmitter channel state information is still very useful," IEEE Trans. Inf. Theory, vol. 58, no. 7, pp. 4418~4431, 2012.", a multi-phase procedure is proposed which turns out to be efficient and achieve the optimal DoF region in BC. In a certain phase m, the transmitter sends order-m symbols (intended for m receivers) created by the OIs. Then, at the end of phase m, order-(m+1) symbols are created and all the order-m symbols may be decoded if all the order-(m+1) are delivered to the related receivers. The transmission is performed till order-K symbols are delivered.

Nonetheless, in IC, such transmission may not be reused directly due to the fact that data is not shared among the transmitters. In other words, a certain Tx may not construct the OI created by the symbols sent from other transmitters. To overcome this, in the technical document "M. J. Abdoli, A. Ghasemi, A. K. Khandani, "On the Degrees of Freedom of K-User SISO Interference and X Channels With Delayed CSIT," Information Theory, IEEE Transactions on, vol. 59, no. 10, pp. 6542,6561, October 2013", a multi-phase transmission for the SISO K Tx-Rx pairs IC is built, which gives the best sum DoF performance so far for the SISO IC. The main feature of the scheme is that the order-m symbols sent from a certain Tx k consists of the symbols intended for Rx k only.

In the current embodiment, proposed schemes for the (K,1,K)-IC are built exactly on the same framework. The only difference is that the number of channel uses that employed to send order-m symbols is reduced by using multiple transmission antennas.

4-2. Transmission Scheme 4-2-1. Transmission and Decoding Flow

Before a detailed description of the current embodiment, terms used in the current embodiment will be defined as follows:

Order-m symbol, denoted by u[i $S_m$]: An order-m symbol (sent from Tx i and consisting of the private symbols intended for Rx i only) is multicast to a certain group of m receivers, namely $S_m$. In other words, the receivers in $S_m$ wish to receive it and decode it, while other receivers overhear it; and Order-(1, m) symbol, denoted by u[i|i; $S_m$]: An order-(1, m) symbol (sent from Tx i consisting of the private symbols intended for Rx i only) is intended for the related Rx i only, but it is already known by the m receivers in the set $S_m$.

Besides, another notation will be provided which is a generalization of the notation of order-(1, m) symbols and frequently used in the following. A symbol that is sent from Tx i consisting of the private symbols intended for Rx i only, intended for a set of receivers $\mathcal{A}$, but already known by Rx j, is denoted by u[i $\mathcal{A}$;j].

Figure 2:
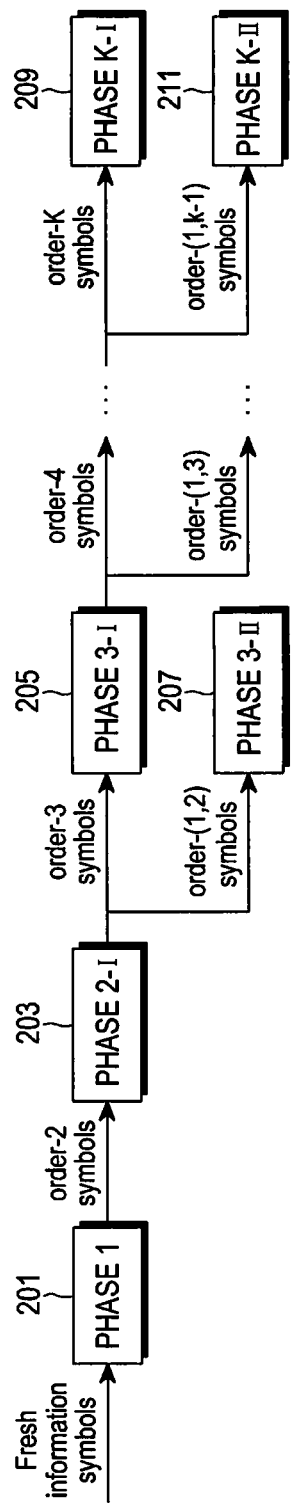
FIG. 2 is a diagram for describing a multi-stage procedure in a wireless communication system according to an embodiment of the present invention.

FIG. 2 is a diagram for describing a multi-stage procedure in a wireless communication system according to an embodiment of the present invention.

Referring to FIG. 2, all the private symbols are transmitted in phase 1, generating order-2 symbols. Then, all the order-2 symbols are transmitted in phase 2 (e.g. phase 2-I 203). At the end of phase 2, two types of higher-order symbols are generated, namely order-3 and order-(1, 2) symbols, which will be delivered in phase 3-I 205 and 3-II 207, respectively. By repeating this operation, a certain order-m (m≥3) symbol is transmitted in phase m-I, while order-(1, m−1) is sent in phase m-II. The transmission completes when order-K and order-(1–k) symbols are delivered.

In FIG. 2, after phase K-I 209 and K-II 211, no higher-order symbol is generated and backward decoding is carried out. Specifically, each receiver may decode order-K symbols and order-(1, K−1) symbols. Then with the knowledge of them, order-(K−1) symbols may be recovered. The same procedure is applicable to decode a certain order-m symbols (m≥2) using order-(m+1) and order-(1, m) symbols. By doing so, all the private symbols sent in phase 1 201 may be recovered with the knowledge of order-2 symbols.

In the current embodiment, the sum DoF is calculated by <Equation 1>.

$$d_s = \frac{N_{sym}}{T_1 + \frac{N_2}{DoF_2(K)}}$$ [Equation 1]

Herein, $N_{sym}$ is the total number of private symbols, $T_1$ refers to the number of channel uses employed in phase 1 201, $N_2$ represents the number of order-2 symbols created by transmitting the $N_{sym}$ fresh symbols. $DoF_2(K)$ characterizes the DoF of sending order-2 symbols in this (K,1,K)-IC. It is computed by the following recursive <Equation 2>.

$$DoF_m(K) = \frac{N_m}{T_m + \frac{N_{m+1}}{DoF_m(k)} + \frac{N_{1,m}}{DoF_{1,m}(K)}},$$ [Equation 2]

$2 \le m \le K - 1,$ $DoF_K(K) = 1,$ $DoF_{1,m}(K) = m + 1.$

In <Equation 2>, $N_m$ and $N_{1,m}$, represent the number of order-m symbols and the number of order-(1,m) symbols, respectively. $T_m$ is the number of channel uses employed to send order-m symbols. $DoF_m(K)$ is the DoF of sending order-m symbols in this (K,1,K)-IC (e.g. how many order-m symbols can 10 be sent per slot). Since order-K symbols are intended for all the K users in the system and each of them is equipped with a single antenna, only 1 order-K symbol can be delivered per channel use, leading to $DoF_K(K)=1$. $DoF_{1,m}(K)$ is the DoF of sending order-(1, m) symbols in this (K,1,K)-IC.

In the embodiment of FIG. 2, consideration may be taken of how many fresh symbols are transmitted in phase I and how many order-2 symbols are generated and how many order-m symbols are input in a certain phase m-I and how many order-(m+1) and order-(1, m) symbols are output, and a detailed description will be made later.

4-2-2. Transmission in Phase 1

In a certain channel use, n(2≤n≤K) transmitters are active (denoting the set as $\mathcal{N}$, other K−n transmitters are silent). Each of them transmits n new symbols to the related receivers. The received signals at a certain Rx k (whose related Tx is active) is written as <Equation 3>.

$$y_k = h_{kk}^H W_k x_k + \Sigma_{j \in \mathcal{N}, j \ne k} h_{kj}^H W_j x_j$$ [Equation 3]

In <Equation 3>, $W_k$, $\forall k \in \mathcal{N}$, of size K×n, is the precoding matrix. $x_k$, $\forall k \in \mathcal{N}$, of size n×1, contains the symbols intended for Rx k. The second term represents the sum of the overheard interferences. Each of the overheard interference can be considered as an order-2 symbol. Specifically, a certain term, $h_{kj}^H W_j x_j = u[j|k,j]$, is required by both Rx k and Rx j. If it is constructed by Tx j and delivered in phase 2-I 203, Rx k can use it to cancel the interference overheard in phase 1 201, while Rx j will obtain another linear observation of $x_j$. If all the order-2 symbols in this channel use is retransmitted, each receiver in $\mathcal{N}$ will cancel all the overheard interferences and have enough linear combination of their intended symbols.

Since there are $\binom{n}{2}$ pairs of receivers in a certain channel use, $\binom{K}{2} \times 2$ order-2 symbols will be generated. Moreover, since there are $\binom{K}{n}$ choices of $\mathcal{N}$, such transmission is repeated by $\binom{K}{n}$ times. This operation may be written as <Equation 4>.

$T_1 = \binom{K}{n},$ $N_{sym} = n^2 \times \binom{K}{n},$ $N_2 = \binom{n}{2} \times 2 \times \binom{K}{n}.$ [Equation 4]

The sum DoF expression may be rewritten as <Equation 5>.

$$d_s = \frac{n^2}{1 + \frac{n(n-1)}{DoF_2(K)}}.$$ [Equation 5]

In <Equation 5>, the value of n is chosen such that $d_s$ is maximized. Hence, the sum DoF performance is given by <Equation 6>.

$$\sum_{k=1}^{K} d_k = \max_{n=2,...,K} \frac{n^2}{1 + \frac{n(n-1)}{DoF_2(K)}} \quad \text{[Equation 6]}$$

4-2-3. Transmission in in Phase m (m≥2)

1) Phase m-I (m >2): Transmission of Order-m Symbols:

In a certain slot, only a certain receiver k is active (others are silent) and transmits K−m+1 order-m symbols (i.e., u[k $S_m$]), which are required by a certain set of receivers $S$. Then the observations at the K−m receivers not in $S_m$, i.e., u[k | $S_m$; j], j∉$S_m$, are linear independent of that observed by the receivers in $S_m$. If these K−m observations are multicast to each receiver in $S_m$, the order-m symbols may be decoded by all the receivers in the set $S_m$.

This transmission is performed $m\binom{K}{m}$ times because there are $\binom{K}{m}$ choices of $S_m$ and each choice has m recievers (for a certain set $S_m$, each receiver k∈$S_m$ take turns to transmit their order-2 symbols, i.e., u[k | $S_m$]). Hence, the number order-m symbols transmitted and the number of channels used may be expressed as <Equation 7>.

$$N_m = (K-m+1) \times m\binom{K}{m},$$

$$T_m = m\binom{K}{m}. \quad \text{[Equation 7]}$$

In Equation 7, $N_m$ represents the number of order-m symbols and $T_m$ represents the number of channels used for transmission of order-m symbols.

2) Generation of Order-(m+1) Symbols:

At the end of phase m-I, a certain Tx k constructs u[k| $S_m$; i],i∉$S_m$, for all the possible choices of $S_m$, using the perfect past CSIT. Then, for a certain set of receivers $S_{m+1}$ that contains k, Tx k gathers all u[k| $S_{m+1}$\j; j], ∀j ∈ $S_{m+1}$, j≠k and creates an order-(m+1) symbol, which is actually a linear combination (LC) of u[k| $S_{m+1}$\j; j], ∀j∈$S_{m+1}$, j≠k, that is, <Equation 8>.

$$u[k| S_{m+1}] = LC(u[k| S_{m+1}\backslash j; j], \forall j \in E \ S_{m+1}, j \neq k). \quad \text{[Equation 8]}$$

For example, $S_{m+1}$=(1,2,3,4), then u[1| $S_{m+1}$]=LC(u[1|123; 4], u[1|134; 2], u[1|124; 3]). Clearly, there are m u[k| $S_{m+1}$\j; j], ∀j ∈ $S_{m+1}$, j≠k. Thus, in order to deliver them to Rx j ∈ $S_{m+1}$, j≠k, m−1 different u[k| $S_{m+1}$] are needed because u[k| $S_{m+1}$\j; j] is available at Rx j. Consequently, the total number of order-(m+1) symbols is given by <Equation 9>. This is because there are $\binom{K}{m+1}$ choices of $S_{m+1}$ and each choice consists of m+1 receivers.

$$N_{m+1} = (m-1)(m+1)\binom{K}{m+1}, \quad \text{[Equation 9]}$$

3) Phase m-II(m≥3): Generation and Transmission of Order-(1,m) Symbols:

A certain Tx k generates m−1 different LCs of u[k| $S_{m+1}$\j; j], ∀j ∈ $S_{m+1}$, j≠k for a certain set $S_{m+1}$. However, that is not enough for Rx k to decode u[k| $S_{m+1}$\j; j], ∀j ∈ $S_{m+1}$, j≠k because there are m u[k| $S_{m+1}$\j; j], ∀j ∈ $S_{m+1}$, j≠k symbols. Thus, one more LC of them is needed. Then, order-(1,m) symbol may be defined as <Equation 10>.

$$u[k|k; \ S_{m+1}\backslash k] = LC(u[k| S_{m+1}\backslash j; j], \forall j \in S_{m+1}, j \neq k). \quad \text{[Equation 10]}$$

It is an order-(1,m) symbol because all the elements in the linear combination are known by the other receivers in $S_{m+1}$ if the transmission of phase m+1-I is finished. The total number of order-(1,m) symbols is expressed as <Equation 11> and this is because there are $\binom{K}{m+1}$ choices of $S_{m+1}$ and each choice consists of m+1 receivers.

$$N_{1,m} = (m+1)\binom{K}{m+1} \quad \text{[Equation 11]}$$

For a certain set $S_{m+1}$, the m+1 order-(1,m) symbols are transmitted simultaneously from the m+1 transmitters. The received signal at a certain receiver may be written as <Equation 12>.

$$y_k = h_{kk}^H w_k u[k|k; \ S_{m+1}\backslash k] + \Sigma_{j \in} \ S_{m+1\backslash j \neq k} h_{kj}^H w_j u[j|j;$$
$$S_{m+1}\backslash j] \quad \text{[Equation 12]}$$

In <Equation 12>, $h_{kj}^H$ is the channel from Tx j to Rx k and $w_j$ is the beamformer of u[j|j; $S_{m+1}$\j]. The second term may be eliminated in <Equation 12> because u[j|j; $S_{m+1}$\j] contains the same symbols as u[j|j; $S_{m+1}$], which will be recovered by Rx k after the transmission of phase m+1-I.

Then, Rx k may proceed to decode u[k|k; $S_{m+2}$\k]. Since m+1 order-(1,m) symbols are successfully transmitted simultaneously, <Equation 13> may be obtained.

$$DoF_{1,m}(K) = m+1. \quad \text{[Equation 13]}$$

In a certain phase m in the current embodiment, since K−m+1 different order-m symbols are transmitted by one Tx per slot, the precoding matrix for these order-m symbols should have full rank. In other words, the transmission can be done using K−m+1 antennas. Specifically, in the current embodiment, K−1 antennas are needed in phase 2 while only a single antenna in phase 2. Hence, if $\Sigma_{k=1}^{K} d_k$ is maximized by n≤K−1 (n is the number of active transmitters per slot in phase 1), the above transmission is applicable to the case where each Tx is equipped with K−1 antennas. In the following description, a 3 Tx-Rx pairs example will be given.

4-2-4. Comparison With Conventional Art

With the value of $T_m$, $N_m$, $N_{m+1}$ and $N_{i,m}$ given in the previous embodiment, $DoF_2(K)$ may be calculated as in <Equation 14>.

$$DoF_2 = \frac{1}{1 - A_2(K)},$$

$$A_2(K) = \frac{1}{K-1} \sum_{l=0}^{K-3} \frac{K-2-l}{(l+1)(l+3)}. \quad \text{[Equation 14]}$$

Then, the sum DoF performance for a given K may be calculated.

Figure 3:
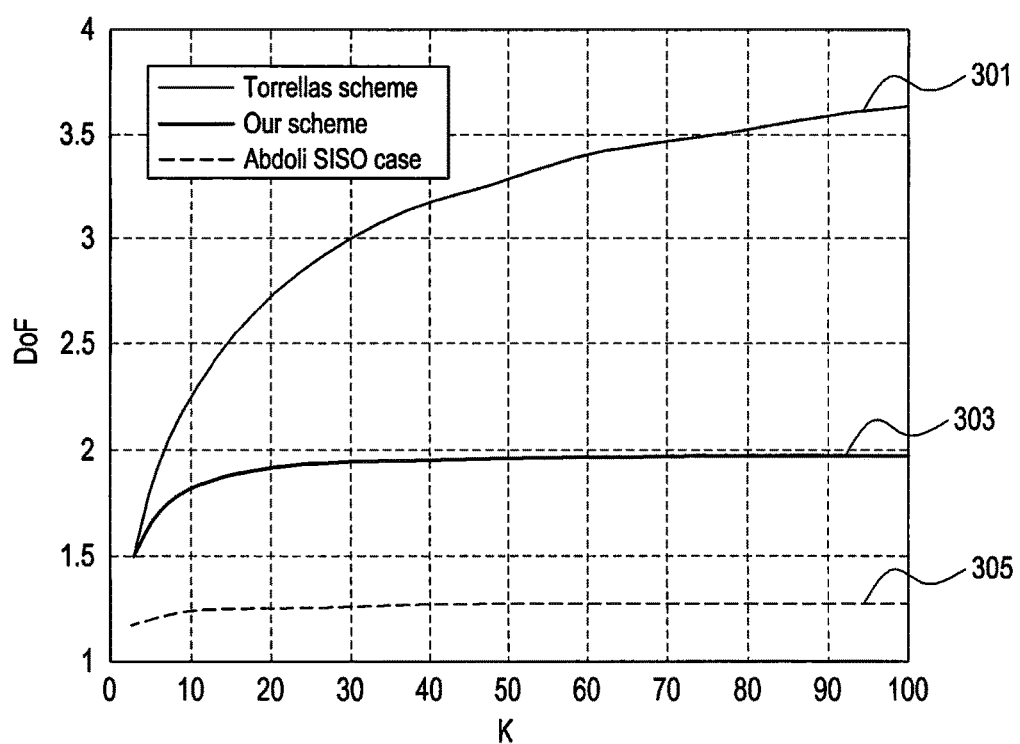
FIG. 3 is a diagram showing comparison in degree of freedom (DoF) performance between a scheme proposed in an embodiment of the present invention and a conventional scheme.

The DoF performance according to the present invention compared to the DoF performance of conventional Torrellas and the DoF performance of Absoli SISO is as shown in FIG. 3. In FIG. 3, reference numeral 301 represents the DoF performance of the present invention, and reference numerals 303 and 305 represent the DoF performance of conventional Torrellas and the DoF performance of Absoli SISO, respectively.

1) Difference from Torrellas Scheme:

The Torrellas scheme, proposed in Marc Torrellas, Adrian Agustin, Josep Vidal, "ON THE DEGREES OF FREEDOM OF THE K-USER MISO INTERFERENCE CHANNEL WITH IMPERFECT DELAYED CSIT", available on arxiv: 1403.7012, is divided into two phases. New symbols are delivered in phase 1, which generate several overheard interferences (order-2 symbols). The main difference from the embodiment of the present invention is that all the overheard interferences are transmitted one by one in phase 2, such that no higher order symbols are created. The Torrellas scheme is briefly expressed as in phases 1 and 2.

Phase 1 consists of K slots, where the K transmitters in turn send K private symbols to the related receivers. In a certain slot k, Tx k is active, and the received signal at Rx k is $y_k = h_{kk}^H W_k x_k$, where $W_k$, of size K×1 is the precoding matrix, while $x_k$ of size K×1, is the symbol vector intended for Rx k. At the same time, all the other receivers overhear $x_k$. The overheard interference at a certain Rx $j \neq k$ is denoted by $h_{jk}^H W_k x_k$. If all $h_{jk}^H W_k x_k$, $j \neq k$ are provided to Rx k, $x_k$ may be decoded.

Phase 2 consists of $\binom{K}{2}$ slots. A certain pair of receivers, i.e., Tx k and Tx j, is active in a certain slot. They construct $h_{jk}^H W_k x_k$ and $h_{jk}^H W_j x_j$, respectively using the perfect past CSIT and multicast them simultaneously. Then Rx k (resp. Rx j) can decode $h_{jk}^H W_k x_k$ (resp. $h_{kj}^H W_j x_j$) as $h_{jk}^H W_j x_j$ (resp. $h_{jk}^H W_k x_k$) is already available at Rx k (Rx j) in the first phase. The sum DoF performance will be $$\frac{2K}{K+1}.$$

The Torrellas scheme is simple and achieves the same sum DoF performance as ours when K=3. However, for very large K, the scheme becomes time-consuming and the DoF performance is bounded by 2. Intuitively, the reason is that the order-2 symbols transmitted in our scheme rely on the transmission of higher-order symbols, which are constructed at the transmitter and the perfect past CSIT is needed. But the perfect past CSIT does not help in transmitting order-2 symbols in the Torrellas scheme.

2 Difference from Abdoli SISO:

The Abdoli scheme, proposed in "M. J. Abdoli, A. Ghasemi, A. K. Khandani, "On the Degrees of Freedom of K-User SISO Interference and X Channels With Delayed CSIT," Information Theory, IEEE Transactions on, vol.59, 5 no.10, pp. 6542,6561, October 2013", focuses on the SISO case. The only difference between our proposed scheme and the Abdoli scheme lies in the phase 1 and the phase m-I (m≥2), that is, the transmission of new symbols and order-m symbols.

To review the difference, let us focus on the transmission in phase 1. In the Abdoli scheme, all the Tx are active in a certain slot and each Tx transmits multiple private symbols to the related Rx. The received signal may be also written as $y_k = h_{kk}^H w_k x_k + \sum_{j \neq k} h_{kj}^H w_j x_j$. However, the second term may not be simply considered as an order-2 symbols because the channel is scalar and $h_{kj}^H w_j x_j$ will align with $h_{jj}^H w_j x_j$ that is received at Rx j. To overcome this, the same private symbols are transmitted in multiple slots, such that Rx k may have an observation of $x_j$ that is linearly independent of that received in Rx j. The similar problem happens in phase m-I, where the same order-m symbols have to be transmitted in multiple slots.

4-3. Example of 3 Tx-Rx Pairs

In the current embodiment, when K=3, one has $DoF_2(3)=6/5$. Besides, to have the maximum sum DoF, the parameter n introduced in the foregoing embodiment is equal to 2 or 3, and the sum DoF is 3/2. This reveals that the transmission strategy is applicable to both the cases where each Tx node is equipped with 2 and 3 antennas. In the current embodiment, the scheme focusing on 3-antenna per Tx will be first proposed and then the achievability of the case with 2-antenn per Tx will be discussed.

In the current embodiment, the sum DoF 3/2 is achieved by sending 6 symbols per Rx in 12 slots. The transmission includes 1) through 3) phases.

1) In phase 1, 6 symbols per Rx are transmitted in 2 slots and 12 order-2 symbols are generated.

2) In phase 2-I, these order-2 symbols are transmitted in 6 slots, resulting in 3 order-3 symbols and 3 order-(1,2) symbols.

3) In phase 3-I, 3 order-3 symbols are transmitted in 3 slots and 3 order-(1;2) symbols are sent in phase 3-II using 1 slot.

Hereinbelow, the above phases will be described in more detail.

4-3-1. Phase 1

Each Tx sends 3 different symbols to its related Rx in each slot. The transmitted signal writes as <Equation 15>.

$$s_k(t) = V_k(t) x_k(t), k=1,2,3, t=1,2 \quad \text{[Equation 15]}$$

Here, $V_k(t)$ is a 3-by-3 full-rank matrix and $x_k(t) = [x_{k1}(t), x_{k2}(t), x_{k3}(t)]^T$. The received signals at Rx1, Rx2 and Rx3 are expressed as <Equation 16>.

$$y_1(t) = h_{11}^H(t) V_1(t) x_1(t) + \underbrace{h_{12}^H(t) V_2(t) x_2(t)}_{u_t[2|1,2]} + \underbrace{h_{13}^H(t) V_3(t) x_3(t)}_{u_t[3|1,3]}, \quad \text{[Equation 16]}$$

$$y_2(t) = \underbrace{h_{21}^H(t) V_1(t) x_1(t)}_{u_t[1|1,2]} + h_{22}^H(t) V_2(t) x_2(t) + \underbrace{h_{23}^H(t) V_3(t) x_3(t)}_{u_t[3|2,3]},$$

$$y_3(t) = \underbrace{h_{31}^H(t) V_1(t) x_1(t)}_{u_t[1|1,3]} + \underbrace{h_{32}^H(t) V_2(t) x_2(t)}_{u_t[2|2,3]} + h_{33}^H(t) V_3(t) x_3(t).$$

Thus far, the symbols contained in $x_1(t)$ may be decoded for 1) and 2).

1) $u_t[2|1,2]$ and $u_t[3|1,3]$ are provided in order to cancel the interference observed in $y_1(t)$.

2) $u_t[1|1,2]$ and $u_t[1|1,3]$ are provided because they are linear independent observations of $x_1(t)$.

Similarly, Rx2 and Rx3 may decode their intended symbols if the interferences are removed and side information are provided. In this way, $u_t[k|k,j]$ is an order-2 symbol that should be decoded by Rx k and j. There are totally 12 order-2 symbols resulted in these two slots. The following slots are employed to multicast $u_1[1|1,2]$, $u_2[1|1,2]$, $u_1[2|1,2]$, and $u_2[2|1,2]$ to Rx1 and Rx2, $u_1[1|1,3]$, $u_2[1|1,3]$, $u_1[3|1,3]$ and $u_2[3|1,3]$ to Rx1 and Rx3 and $u_1[3|3,2]$, $u_2[3|3,2]$, $u_1[2|3,2]$ and $u_2[2|3,2]$ to Rx2 and Rx3.

4-3-2. Phase 2-I

The transmission is divided into three sub-phases and each sub-phase contains two slots. In a certain sub-phase, the order-2 symbols intended for a certain pair of receivers (e.g. Rx k and Rx j) are transmitted. During the two slots of the sub-phase, Tx k and Tx j are alternatively active and respectively transmitting the terms $u_1[k|k, j]$, $u_2[k|k, j]$ and $u_1[j|k, j]$, $u_2[j|k, j]$.

More specifically, sub-phase 2-I.1, slot 3: The transmitted and received signal write as <Equation 17>.

$$s_1(3) = V_1(3) [u_1[1|1,2], u_2[1|1,2]]^T,$$

$$y_1(3) = h_{11}^H(3) V_1(3) [u_1[1|1,2], u_2[1|1,2]]^T,$$

$$y_2(3) = h_{21}^H(3) V_1(3) [u_1[1|1,2], u_2[1|1,2]]^T,$$

$$y_3(3) = h_{31}^H(3) V_1(3) [u_1[1|1,2], u_2[1|1,2]]^T = u[1|1,2; 3], \quad \text{[Equation 17]}$$

where $V_1(3)$ is a full rank matrix of size 3×2. $u_1[1|1,2]$ and $u_2[1|1,2]$ will be decodable at Rx1 and Rx2 if $u[1|1,2; 3]$ is provided to them as it is a linear independent observation of $y_1(3)$ and $y_2(3)$.

Sub-phase 2-I.2, slot 4: The transmitted signal and received signals write as <Equation 18>.

$$s_1(4) = V_2(4) [u_1[2|1,2], u_2[2|1,2]]^T,$$

$$y_1(4) = h_{11}^H(4) V_2(4) [u_1[2|1,2], u_2[2|1,2]]^T,$$

$$y_2(4) = h_{21}^H(4) V_2(4) [u_1[2|1,2], u_2[2|1,2]]^T,$$

$$y_3(4) = h_{31}^H(4) V_2(4) [u_1[2|1,2], u_2[2|1,2]]^T = u[2|1,2; 3], \quad \text{[Equation 18]}$$

where $V_1(4)$ is a full rank matrix of size 3×2. Similarly, $u_1[2|1,2]$ and $u_2[2|1,2]$ will be decodable at Rx1 and Rx2 if $u[2|1,2; 3]$ is provided.

Following the same framework, the transmission in sub-phase 2-I.2 and 2-I.3 are summarized in Table I. To sum, the transmission is finalized if $u[1|1,2; 3]$ and $u[2|1,2; 3]$ are provided to Rx1 and Rx2, $u[1|1,3; 2]$ and $u[3|1,3; 2]$ are provided to Rx1 and Rx3, while $u[2|2,3; 1]$ and $u[3|2,3; 1]$ are provided to Rx2 and Rx3. To this end, the transmission in the last phase of the scheme proposed in the Abdoli SISO scheme may be reused.

TABLE 1

| Subphase | Tx1 | Tx2 | Tx3 | Rx1 | Rx2 | Rx3 |
|---|---|---|---|---|---|---|
| 2-I.2, slot 5 | $V_1(5)\begin{bmatrix} u_1[1\mid1,3] \\ u_2[1\mid1,3] \end{bmatrix}$ | Silence | Silence | $y_1(5)$ | $u[1\mid1,3;2]$ | $y_3(5)$ |
| 2-I.2, slot 6 | Silence | Silence | $V_3(6)\begin{bmatrix} u_1[3\mid1,3] \\ u_2[3\mid1,3] \end{bmatrix}$ | $y_1(6)$ | $u[3\mid1,3;1]$ | $y_3(6)$ |
| 2-I.3, slot 7 | Silence | $V_2(7)\begin{bmatrix} u_1[2\mid2,3] \\ u_2[2\mid2,3] \end{bmatrix}$ | Silence | $u[2\mid2,3;1]$ | $y_2(7)$ | $y_3(7)$ |
| 2-I.3, slot 8 | Silence | Silence | $V_3(8)\begin{bmatrix} u_1[3\mid2,3] \\ u_2[3\mid2,3] \end{bmatrix}$ | $u[3\mid3,2;1]$ | $y_2(8)$ | $y_3(8)$ |

4-3-3. Phases 3-I and 3-II

The transmission of this phase follows exactly the same footsteps as that in the Abdoli SISO scheme. Using the new order-2 symbols generated above, the order-3 symbols are constructed as in <Equation 19>:

$$u[1\mid1,2,3]=LC(u[1\mid1,2;3], u[1\mid1,3;2]),$$

$$u[2\mid1,2,3]=LC(u[2\mid1,2;3], u[2\mid2,3;1]),$$

$$u[3\mid1,2,3]=LC(u[3\mid1,3;2], u[3\mid2,3;1]), \quad \text{[Equation 19]}$$

where LC represents linear combination. u[1|1,2,3], u[2|1,2,3] and u[3|1,2,3] are respectively transmitted from Tx1 in slot 9, Tx2 in slot 10 and Tx3 in slot 11 (e.g., phase 3-I), using a single antenna. Consequently, Rx1 observes three linear independent observations of u[1|1,2; 3], u[2|1,2; 3], u[2|1,2; 3] and u[3|1,2; 2] without interference since u[2|2,3; 1] and u[3|2,3; 1] may be removed from the past received signals at Rx1. The received signals at Rx2 and Rx3 follow similarly. So far, one more linear independent observation is needed to decode those four terms at each Rx. To this end, in the 12th slot (e.g. phase 3-II), each Tx creates an order-(1;2) symbol and transmits them simultaneously. The order-(1;2) symbols are given as <Equation 20>.

$$u[1\mid1;2,3]=LC(u[1\mid1,2;3], u[1\mid1,3;2]),$$

$$u[2\mid2;1,3]=LC(u[2\mid1,2;3], u[2\mid2,3;1]),$$

$$u[3\mid3;1,2]=LC(u[3\mid1,3;2], u[3\mid2,3;1]), \quad \text{[Equation 20]}$$

4-3-4. Alternative Expression for Transmission in Phase 3-I and Phase 3-II

Generally, when each Tx node is equipped with 3 transmission antennas, the transmitted signals in this phase may be written as <Equation 21>.

$$s_1(t)=V_1(t)\,[u[1\mid1,2;3], u[1\mid1,3;2]]^T,$$

$$s_2(t)=V_2(t)\,[u[2\mid1,2;3], u[2\mid2,3;1]]^T,$$

$$s_3(t)=V_3(t)\,[u[3\mid1,3;2], u[3\mid2,3;1]]^T, \quad \text{[Equation 21]}$$

where t=9, 10, 11, 12. The received signals at Rx1 are expressed as

<Equation 22>.

$$\begin{bmatrix} y_1(9) \\ y_1(10) \\ y_1(11) \\ y_1(12) \end{bmatrix} = \mathcal{H}_1^{phase3}[u[1\mid1,2;3], u[1\mid1,3;2], u[2\mid1,2;3], u[3\mid1,3;2]]^T + H_{1,int}^{phase3}[u[2\mid2,3;1], u[3\mid2,3;1]]^T, \quad \text{[Equation 22]}$$

$$\mathcal{H}_1^{phase3} = \begin{bmatrix} h_{11}^H(9)V_1(9)[:,1] & h_{11}^H(9)V_1(9)[:,2] & h_{12}^H(9)V_2(9)[:,1] & h_{13}^H(9)V_3(9)[:,1] \\ h_{11}^H(10)V_1(10)[:,1] & h_{11}^H(10)V_1(10)[:,2] & h_{12}^H(10)V_2(10)[:,1] & h_{13}^H(10)V_3(10)[:,1] \\ h_{11}^H(11)V_1(11)[:,1] & h_{11}^H(11)V_1(11)[:,2] & h_{12}^H(11)V_2(11)[:,1] & h_{13}^H(11)V_3(11)[:,1] \\ h_{11}^H(12)V_1(12)[:,1] & h_{11}^H(12)V_1(12)[:,2] & h_{12}^H(12)V_2(12)[:,1] & h_{13}^H(12)V_3(12)[:,1] \end{bmatrix},$$

$$H_{1,int}^{phase3} = \begin{bmatrix} h_{12}^H(9)V_2(9)[:,2] & h_{13}^H(9)V_3(9)[:,2] \\ h_{12}^H(10)V_2(10)[:,2] & h_{13}^H(10)V_3(10)[:,2] \\ h_{12}^H(11)V_2(11)[:,2] & h_{13}^H(11)V_3(11)[:,2] \\ h_{12}^H(12)V_2(12)[:,2] & h_{13}^H(12)V_3(12)[:,2] \end{bmatrix},$$

where $V_{1K}(t)[:,1]$ and $V_{1K}(t)[:,2]$ represent the first and second column in the matrix $V_{1K}(t)$. The term consisting of u[2|2,3; 1] and u[3|2,3; 1] may be removed. The matrix $H_1^{phase3}$ may be full rank almost for sure and the terms u[1|1,2; 3], u[1|1,3; 2], u[2|1,2; 3] and u[3|1,3; 2] may be decoded by Rx1.

If $V_1(9)$, $V_2(10)$ and $V_3(11)$ are row vectors, $V_1(10)$, $V_1(11)$, $V_2(9)$, $V_2(11)$, $V_3(9)$ and $V_3(10)$ are zero matrices and $V_K(12)$, k=1,2,3 is a full rank matrix, then the transmission boils down to that in the SISO case as in the Abdoli SISO scheme.

4-3-5. Applied to 2-Transmission Antenna Case

From the above embodiment of the present invention, it can be seen that the transmission of order-2 symbols (i.e., phase 2-I) requires maximum 2 transmission antennas and even a single antenna is sufficient for the third phase. Hence, when each Tx node is equipped with 2 transmission antennas, if we send new symbols in phase I and generate 12 order-2 symbols, those order-2 symbols may be transmitted using exactly the same strategy discussed in the above embodiment.

However, when each Tx node is equipped with 2 transmission antennas, the new symbols cannot be sent in the above-described way. The reason is as follows. For Rx1, the symbol vector $x_1(t)$ contains 3 different symbols, when $u_r[1|1,2]$ and $u_r[1|1,3]$ are provided to Rx1, Rx1 still may not decode $x_1(t)$ because Tx1 has only two antennas and the terms $h_{11}V_1(t)$, $h_{21}V_1(t)$ and $h_{31}V_1(t)$ are linear dependent. Hence, each Tx has to send two symbols to the related receiver at a time and repeats the transmission till there are 12 order-2 symbols to be sent.

Basically, there are 6 slots in the phase 1 and 8 symbols per Rx are transmitted. Specifically, the transmitted signals at slot 1, 2 and 3 (repeated at slot 4, 5 and 6) write as <Equation 23>.

$$s_1(1)=V_1(1)x_1(1),\ s_2(1)=V_2(1)x_2(1),\ s_3(1)=0,$$

$$s_1(2)=V_1(2)x_1(2),\ s_2(2)=0,\ s_3(2)=V_3(2)x_3(2),$$

$$s_1(1)=0,\ s_2(3)=V_2(3)x_2(3),\ s_3(3)=V_3(3)x_3(3), \quad \text{[Equation 23]}$$

where $V_k(t)$, $k=1,2,3$, $t=1,2,3$ is a full rank 2×2 matrix, the symbol vector writes as $x_k(t)=[x_{k1}(t), x_{k2}(t)]^T$. As shown, in each slot, two transmitters are active sending symbols to their related receivers while the other Tx keeps silence. The received signals are expressed as <Equation 24>.

$$y_1(1) = h_{11}^H(1)V_1(1)x_1(1) + \underbrace{h_{12}^H(1)V_2(1)x_2(1)}_{u_1[2|1,2]}, \quad \text{[Equation 24]}$$

$$y_2(1) = \underbrace{h_{21}^H(1)V_1(1)x_1(1)}_{u_1[1|1,2]} + h_{22}^H(1)V_2(1)x_2(1),$$

$$y_3(1) = LC(x_1(1), x_2(1)),$$

$$y_1(2) = h_{11}^H(2)V_1(2)x_1(2) + \underbrace{h_{13}^H(2)V_3(2)x_3(2)}_{u_1[3|1,3]},$$

$$y_2(2) = LC(x_1(2), x_3(2)),$$

$$y_3(t) = \underbrace{h_{31}^H(2)V_1(2)x_1(2)}_{u_1[1|1,3]} + h_{33}^H(2)V_3(2)x_3(2),$$

$$y_1(3) = LC(x_2(3), x_3(3)),$$

$$y_2(3) = h_{22}^H(3)V_2(3)x_2(3) + \underbrace{h_{23}^H(3)V_3(3)x_3(3)}_{u_1[3|2,3]},$$

$$y_3(3) = \underbrace{h_{32}^H(3)V_2(3)x_2(3)}_{u_1[2|2,3]} + h_{33}^H(3)V_3(3)x_3(3).$$

In slot 1, just like the two-receiver alternative-MAT scheme proposed in "S. Yang, M. Kobayashi, D. Gesbert, and X. Yi," degrees of freedom of time correlated miso broadcast channel with delayed csit," IEEE Trans. Inf. Theory, 5 vol. 59, no. 1, pp. 315-328, 2013.", if the overheard signal $u_1[1|1,2]$ and $u_1[2\equiv 1,2]$ are provided to both Rx1 and Rx2, $x_1(1)$ and $x_2(1)$ will be decoded by Rx1 and Rx2 respectively. Similar observations may be seen from Rx1 and Rx3 in slot 2 and Rx2 and Rx3 in slot 3.

The transmissions repeat in slot 4, 5 and 6, such that there are totally 12 order-2 symbols to be sent. The equations are omitted for brevity. Consequently, 24 symbols (8 per Rx) are transmitted in 16 slots (6 in phase I and 10 in phase 2 and 3 in the foregoing embodiment). The sum DoF is 24/16=3/2.

The embodiments of the present invention may provide a new technology for multi-antenna wireless communication systems replying on outdated/delayed channel state information at the transmitter. More specifically, the embodiments of the present invention provide a scheme for performing channel estimation by relying on current LTE-A system frameworks, without depending on CSI sharing between users. Moreover, the embodiments of the present invention may provide a scheme for investigating the effect of backhaul delay on CoMP performance and solving the problem thereof.

While the embodiments have been described separately herein, two or more of the embodiments may be implemented in combination.

In the embodiments of the present invention, each of a terminal and a base station may be implemented by including a transmitter, a receiver, or a transceiver for communication over a wireless network, and a controller for controlling operations according to the foregoing embodiments.

The embodiments of the present invention may be embodied as computer-readable codes on a computer-readable recording medium. The computer-readable recording medium is any data storage device that can store data which can be thereafter read by a computer system. Examples of the computer readable recording medium include read-only memory (ROM), random-access memory (RAM), compact disk (CD)-ROMs, magnetic tapes, floppy disks, optical data storage devices, and carrier waves (data transmission through the Internet). The computer-readable recording medium can also be distributed over network coupled computer systems so that the computer-readable code is stored and executed in a distributed fashion. Also, functional programs, codes, and code segments for accomplishing the present invention can be easily construed by programmers skilled in the art to which the present invention pertains.

The embodiments of the present invention can be implemented in hardware or a combination of hardware and software. The software can be recorded to a volatile or non-volatile storage device such as a ROM irrespective of deletable or re-recordable, to a memory such as a RAM, a memory chip, a memory device, or an integrated circuit, or to a storage medium that is optically or magnetically recordable and readable by a machine (e.g. a computer), such as a CD, a digital video disc (DVD), a magnetic disk, or a magnetic tape. The storage is an example of a machine-readable storage medium suitable for storing a program or programs including instructions to implement the embodiments of the present invention.

The invention claimed is:

1. A method for performing channel estimation, by a first terminal, in a wireless communication system, the method comprising:
receiving demodulation-reference signals (DM-RSs) transmitted through a plurality of slots; and
performing the channel estimation by using the DM-RSs,
wherein at least one first slot of the plurality of slots includes at least one first DM-RS, which is used to perform channel estimation on a first signal transmitted to a second terminal,
wherein at least one second slot of the plurality of slots includes at least one second DM-RS, which is used to perform channel estimation on a second signal transmitted to the first terminal,
wherein at least one third slot of the plurality of slots includes at least one third DM-RS, which is used to perform channel estimation on a third signal transmitted to the first terminal and the second terminal,
wherein the at least one third slot of the plurality of slots includes at least two fourth DM-RSs, which are used to perform channel estimation on a first sub signal and a second sub signal included in the third signal transmitted to the first terminal and the second terminal, wherein the first sub signal is related to the first signal and the second sub signal is related to the second signal, and wherein the first sub signal is derived from a result of channel estimation by using the at least one first DM-RS, and the second sub signal is derived from a result of channel estimation by using the at least one second DM-RS.

2. The method of claim 1, wherein the third signal is a mixture of overhead interference related to the first signal and the second signal.

3. The method of claim 1, wherein a number of the DM-RSs varies with an architecture of a receiver.

4. The method of claim 1, wherein a channel state is estimated without sharing channel state information with other terminals.

5. A first terminal for performing channel estimation in a wireless communication system, the terminal comprising:
   a receiver configured to receive signals transmitted from the base station; and
   a processor coupled with the receiver and configured to control the receiver to receive demodulation-reference signals (DM-RSs) transmitted through a plurality of slots, and to perform the channel estimation by using the DM-RSs,
   wherein at least one first slot of the plurality of slots includes at least one first DM-RS, which is used to perform channel estimation on a first signal transmitted to a second terminal,
   wherein at least one second slot of the plurality of slots includes at least one second DM-RS, which is used to perform channel estimation on a second signal transmitted to the first terminal,
   wherein at least one third slot of the plurality of slots includes at least one third DM-RS, which is used to perform channel estimation on a third signal transmitted to the first terminal and the second terminal,
   wherein the at least one third slot of the plurality of slots includes at least two fourth DM-RS, which are used to perform channel estimation on a first sub signal and a second sub signal included in the third signal transmitted to the first terminal and the second terminal,
   wherein the first sub signal is related to the first signal and the second sub signal is related to the second signal, and
   wherein the first sub signal is derived from a result of channel estimation by using the at least one first DM-RS, and the second sub signal is derived from a result of channel estimation by using the at least one second DM-RS.

6. The first terminal of claim 5, wherein the third signal is a mixture of overhead interference related to the first signal and the second signal.

7. The first terminal of claim 5, wherein a number of the DM-RSs varies with an architecture of a receiver.

8. The first terminal of claim 5, wherein the processor is configured to estimates a channel state without sharing channel state information with other terminals.

* * * * *